United States Patent [19]

Hirohata et al.

[11] 4,410,249
[45] Oct. 18, 1983

[54] CAMERA WITH ELECTROMAGNETICALLY OPERATED SHUTTER

[75] Inventors: Michio Hirohata, Inagi; Hideo Ikari, Tokyo, both of Japan

[73] Assignee: Canon Kabushiki Kaisha, Tokyo, Japan

[21] Appl. No.: 374,108

[22] Filed: May 3, 1982

[51] Int. Cl.³ .......................... G03B 7/08; G03B 9/00
[52] U.S. Cl. ...................................... 354/30; 354/59; 354/230; 354/234
[58] Field of Search .................................... 354/26–30, 354/42, 49, 59, 230, 234, 235

[56] References Cited

U.S. PATENT DOCUMENTS

| | | | |
|---|---|---|---|
| 4,032,941 | 6/1977 | Douglas et al. | 354/230 |
| 4,338,014 | 7/1982 | Yoshida et al. | 354/234 |
| 4,348,092 | 9/1982 | Hirohata et al. | 354/230 |

*Primary Examiner*—William B. Perkey
*Attorney, Agent, or Firm*—Toren, McGeady and Stanger

[57] ABSTRACT

A camera having an electromagnetically operated shutter in which a plurality of shutter blades arranged to perform a combined function as a diaphragm are driven to gradually open the shutter from a fully closed state in effecting an exposure. Prior to effecting an exposure, the shutter blades change from a deeply overlapped state to a shallowly overlapped state.

5 Claims, 5 Drawing Figures

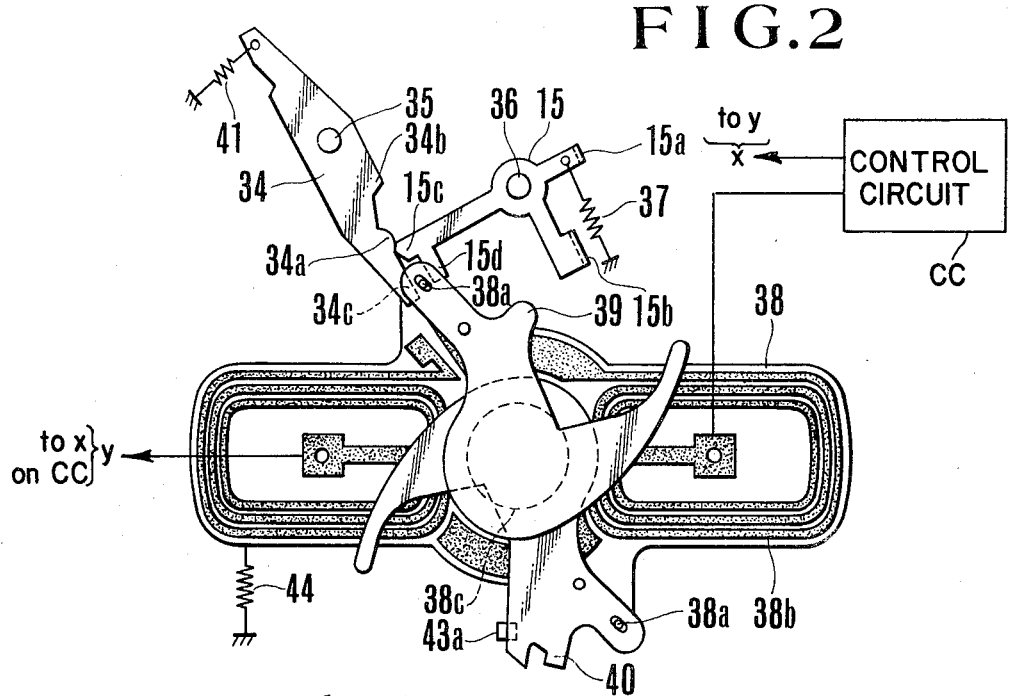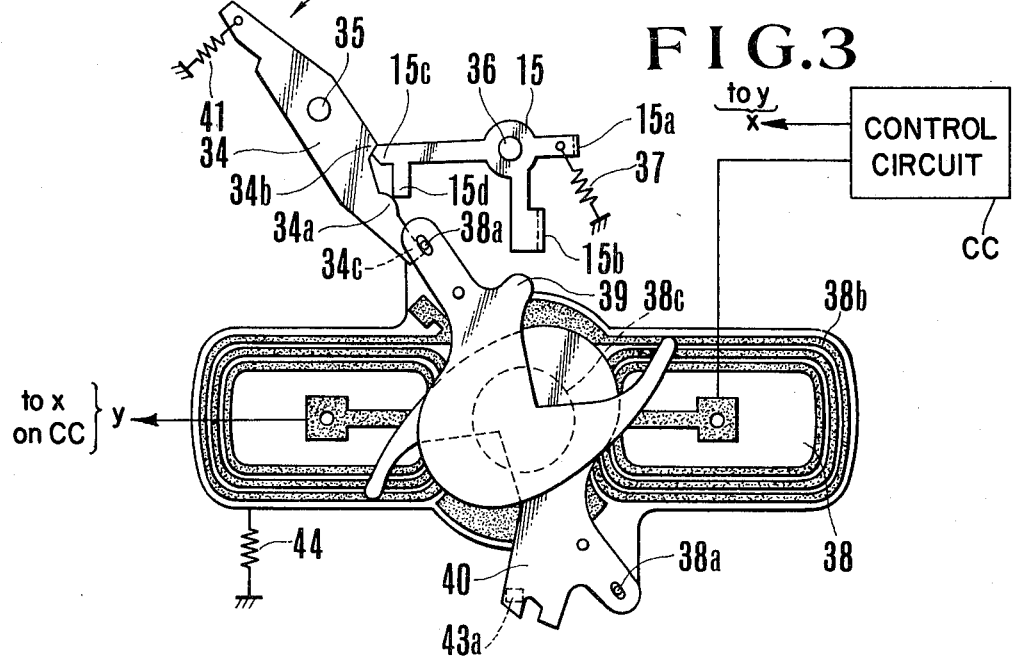

WHERE OVERLAPPING OF BLADES IS DEEP

WHERE OVERLAPPING OF BLADES IS SHALLOW

CAMERA WITH ELECTROMAGNETICALLY OPERATED SHUTTER

BACKGROUND OF THE INVENTION

1. Field of the Invention

This invention relates to a camera having an electromagnetically operated shutter.

2. Description of the Prior Art

Electromagnetically driven shutters of the type in which shutter blades that also serve as diaphragm blades which are driven to open and close the shutter by means of an electromagnetic drive source of the moving coil type are known. In a shutter of this type, the driving force available is almost unvarying. This results in a uniformly accelerated motion of the moving part such as a sector ring, etc. Therefore, the opening characteristic of the shutter is represented by a curve close to a parabola. Accordingly, the length of time required before an aperture is obtained varies with the degree of overlap of the shutter blades. Hence, in order to have accurate control, it has generally been considered advantageous to obtain a small aperture by establishing a shallow overlap for the shutter blades and by moving the blades more slowly at the smaller diameter portion stage in the process of opening the aperture. In the accompanying drawings, FIGS. 4(a) and (b) show this graphically. The graphs show the relation of time to the rotation angles of the sector rings of electromagnetically operated shutters which have the same opening stroke of the shutter blade members from a pin-hole state to a fully open state while the blade members are arranged to overlap each other to different extents. FIG. 4(a) represents the arrangement where the degree of shutter blade overlap is deep and FIG. 4(b) an arrangement where the degree of shutter blade overlap is shallow. As will be clearly understood from FIGS. 4(a) and (b), the rotation of the sector ring of an electromagnetically operated shutter exhibits a close to uniform acceleration movement, which results in a shutter blade opening characteristic curve close to a parabola. Accordingly, the length of time between a pin-hole state and a fully open state is longer where the degree of blade members overlap is shallow and the energy of motion is small at the pin-hole point as in the case of FIG. 4(b) than where the overlapping degree of blade members is deep as shown in FIG. 4(a). Thus, the arrangement represented by FIG. 4(b) permits more accurate exposure control. In other words, in an electromagnetically operated shutter, the shallower the overlapping degree is, the greater the accuracy thereof will be.

However, in the case of an electromagnetically operated shutter consisting of two blade members, in order to obtain a higher light shielding effect when these blade members are closed, they must be arranged to overlap to a deeper extent. Hence, in the conventional electromagnetically operated shutter of this type, a considerable amount of energy of motion is stored at a moving system (such as the blade members) when these blade members open from a closed condition to the point where they form a pin-hole. Then, the stored energy hinders accurate control over the blade members, particularly in the case of a small aperture. This has resulted in many inconveniences for exposure control. Meanwhile, the electromagnetically operated two-blade shutter is advantageous with respect to cost on account of the smaller number of blade members and parts required, which not only facilitates assembly work but also results in fewer parts that might cause a malfunction. These advantages have recently prompted use of the shutter of this type. Therefore, a strong desire has arisen for an electromagnetically operated shutter that obviates the above-mentioned shortcoming.

Also conventionally known is an electromagnetically operated shutter in which the object brightness is measured in advance through a preliminary aperture with an auxiliary diaphragm. In such conventional shutters, it is common that when the preliminary aperture of the auxiliary diaphragm is once closed by the start of the operation of the blade members of the electromagnetically operated shutter, the count starting switch for exposure control is mechanically turned on to control the exposure by the auxiliary diaphragm, or the count starting switch is turned on by electrically detecting the closure of the preliminary aperture of the auxiliary diaphragm.

It is also conventionally known that the count starting switch is turned on a predetermined time after the current passage to the moving coil of an electromagnetically operated shutter so as to detect the extent of exposure in response to the opening operation of the blade members.

The above conventional electromagnetically operated shutters have a number of defects. Where the count starting switch is mechanically turned on by the operation of the blade member, etc., when the preliminary aperture of the auxiliary aperture of the auxiliary diaphragm is closed, the preliminary aperture is completely shut by the operation of the blade member. Because the count starting switch must be mechanically turned on before the opening of the main aperture is started by the blade members, the timing adjustment is complicated and erroneous.

Further, where the closure of the preliminary aperture of the auxiliary diaphragm is electrically detected, the brightness range in which the camera is operative must be at the light level of $2^{10}$–$2^{15}$ is that quite a large circuit is required for consistent operation of the detection circuit. This causes an increase in the production cost.

Also where the count starting switch is turned on a predetermined time after the current passage to the electromagnetically operated shutter for actuating the blade members, a timer which can operate accurately in a temperature range from $-20°$ C. to $45°$ C. such as a crystal oscillator is required. This results in a considerable increase in the circuit cost.

SUMMARY OF THE INVENTION

The present invention results from an attempt to meet the above-stated desire and avoid the aforementioned disadvantages. It is therefore an object of the invention to provide an electromagnetically operated shutter for a camera which is arranged to make the overlapping degree of shutter blade members shallower at the beginning of an exposure and to keep them overlapped to a deeper degree at other times for attaining an improved light shielding effect of the shutter as well as accurate control of exposure light quantity.

It is another object of the invention to provide an electromagnetically operated shutter wherein the degree of overlap of the shutter blades is varied by slightly turning a sector ring which actuates the shutter blades by preliminary current passage to the electromagnetic member and other preparatory actions of the camera are achieved by double movement of the sector ring before operation of the shutter, and when the above preliminary current passage is effected, the operation of the automatic focal adjustment mechanism is started, and the preliminary aperture of the auxiliary diaphragm is closed so as to enable the turning on of the count starting switch simultaneously when the electromagnetically operated shutter is again supplied with current, thereby to accurately control the exposure with a simplified structure.

These and other objects and features of the invention will become apparent from the following detailed description thereof taken in connection with the accompanying drawings.

BRIEF DESCRIPTION OF THE DRAWINGS

The accompanying drawings illustrate an embodiment of the invention.

FIG. 2 is a plan view showing shutter blades in a deeply overlapping locked state.

FIG. 3 is a plan view showing the condition of the shutter immediately before the operation thereof with shutter blades shallowly overlapping each other.

DESCRIPTION OF PREFERRING EMBODIMENT OF THE INVENTION

Figure 1:
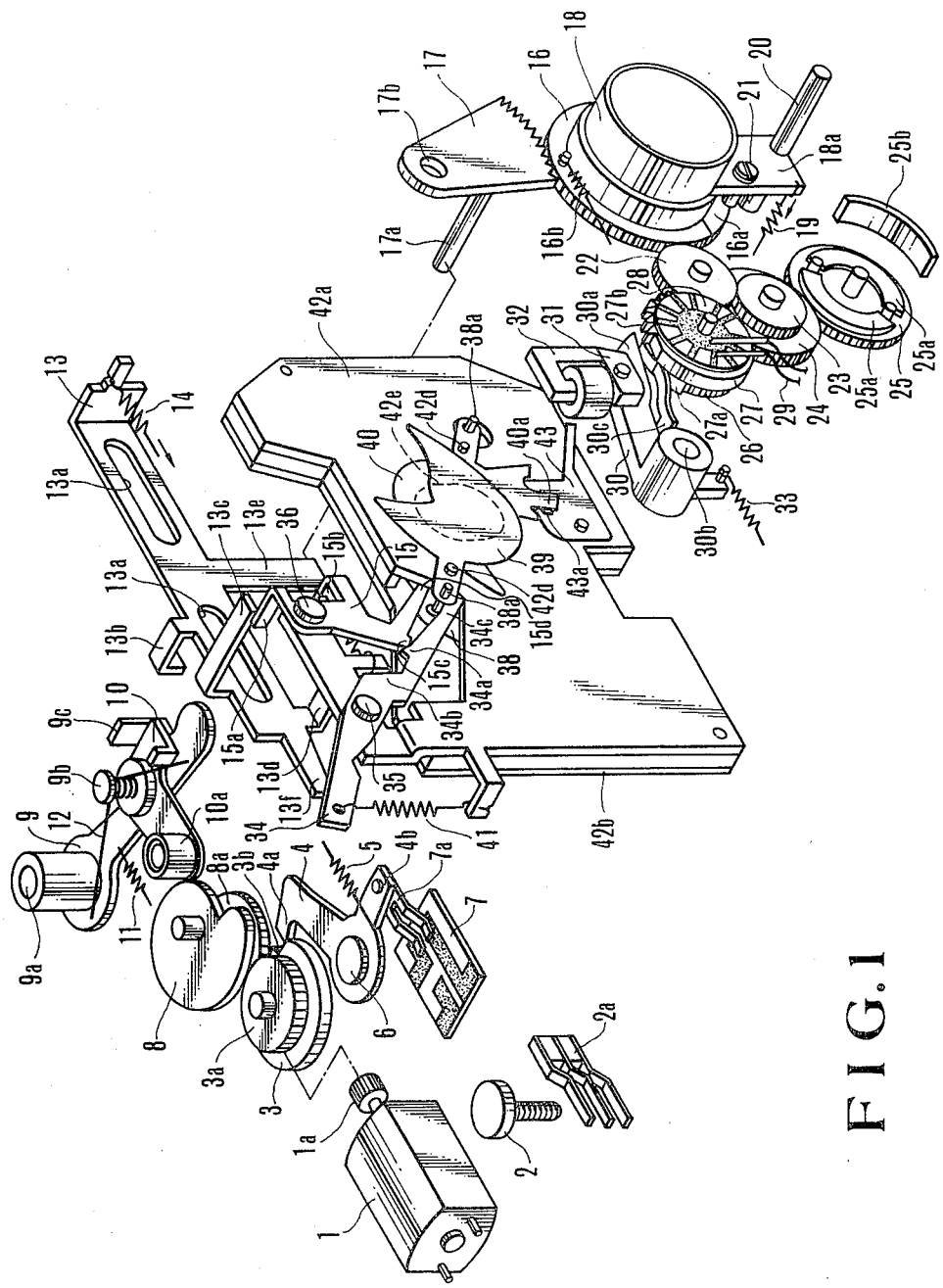
FIG. 1 is an oblique view showing the essential parts of a camera to which the present invention is applied.
Figure 4A:
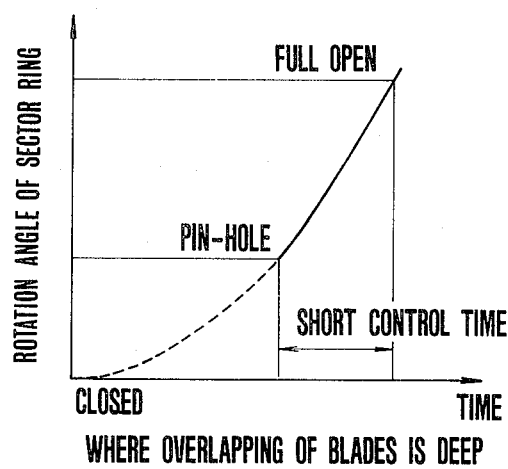
FIG. 4(a) is a graph representing a case where the overlapping of shutter blades is deep and FIG. 4(b) another graph representing a case where the overlapping of shutter blades is shallow.
Figure 4B:
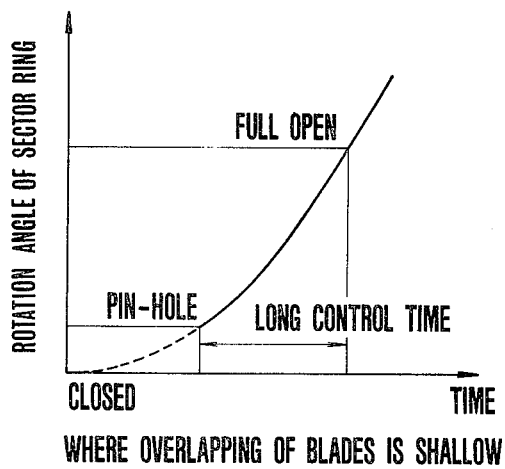
FIG. 4 shows in graphs the relation of the rotation angle of the sector ring of the shutter to time.

The embodiment illustrated by the accompanying drawings represents an example where the present invention is applied to a camera having an automatic focusing device. The embodiment as shown in FIGS. 1 and 2 is in a state after completion of a film winding action. Meanwhile, FIG. 3 shows the embodiment immediately before a shutter operation. In these drawings, shutter support plates 42a and 42b are provided with a photograph taking aperture 42e and are secured to a camera body which is not shown. Between these shutter support plates 42a and 42b, there is provided a sector ring 38 which is as shown in FIGS. 2 and 3. The sector ring 38 is provided with a photograph taking aperture 38c and a patternized conductor coil 38b which is disposed on the surface thereof. The sector ring 38 is formed as a rotor which is arranged to be rotatable within the magnetic field of a permanent magnet carried jointly by the above-stated support plates 42a and 42b when the coil 38b is energized. The structure of this portion is the same as disclosed in Japanese Laid-Open Patent application Sho 55-74523. Shutter blades 39 and 40 which also serve as diaphragm blades are pivotally supported respectively by the support plate 42a through shafts 42d. The shutter blades 39 and 40 each have slits engaging pins 38a which are arranged on the sector ring 38 and extend through the support plate 42a. The pins 38a open and close the aperture by rotating the blades 39 and 40 about the shafts 42d by means of rotation of the sector ring 38. A spring 44 urges the sector ring 38 to rotate in the direction in which the shutter blades close the aperture. A lock lever 15 is pivotally supported by the support plate 42a through a shaft 36. The lever 15 is urged clockwise by a spring 37 and includes an arm 15d which is engageable with the pin 38a of the sector ring 38. A holding lever 34 which is pivotally attached to the support plate 42a by a shaft 35 is urged counterclockwise by a spring 41. In the condition illustrated in FIG. 1, the first engaging part 34a of the holding lever 34 engages one end 15c of the lock lever 15 to hold the arm 15d of the lever 15 within the rotating path of the pin 38a and to hold a set plate 13 which will be described later herein in a set position through another arm 15a of the lever. In this condition, the pin 38a of the sector ring 38 engages the arm 34c of the holding lever 34 and the shutter blades 38 and 40 jointly close the photograph taking aperture by deeply overlapping. A lens barrel carrying a photograph taking lens is provided with an arm part 18a, which is arranged to be fitted on a pin 20 secured to the support plate 42a through a base plate (not shown) and to be linearly movable in the direction of an optical axis. A cam ring 16 which is provided with a cam 16a is carried by the support plate 42a through a base plate (not shown) and is rotatable around the optical axis of the photograph taking lens. A toothed part 16b is formed along the outer circumference of the cam ring 16. The arm part 18a of the lens barrel 18 holds a cam follower 21 which is urged by a spring 19 to have its fore end contact the cam 16a and is thus arranged to follow the cam 16a. The cam follower 21 permits fine adjustment by means of a screw. A spring 16b urges the cam ring 16 counterclockwise. A governor gear 25 engages the cam ring 16 through a gear train 22, 23 and 24. The governor gear 25 is provided with a brake member 25a and a fixed brake shoe 25b which forms a centrifugal brake to control the rotating speed of the cam ring 16 so it is unvarying. The brake shoe is secured to a support plate 2a provided on a base plate (not shown). The gear 24 engages a gear 26. The gear 26 carries a ratchet wheel 27 and a pulse plate 28. A stop lever 30 includes a pawl 30a arranged to engage the teeth 27b. The stop lever 30 is further provided with an armature 31 which is arranged to be attracted by an electromagnet 32 and is rotatably supported by a shaft 30b. A spring 33 urges the lever 30 clockwise. A plate spring 30c is attached to one end of the stop lever and is arranged to push the armature 31 against the electromagnet 32. The fore end of the plate spring 30c abuts a cam portion 27a on the ratchet wheel 27.

An auxiliary diaphragm plate 43 is secured to the support plate 42a and is provided with a light measuring window 43a for guiding light from an object to be photographed to a light-sensitive element (not shown) behind the auxiliary diaphragm plate 43. The photometric window 43a is arranged to be opened and closed by a portion 40a of the shutter blade 40.

A sector gear 17 is arranged to engage the teeth 16b of the cam ring 16 and is pivotally supported by the support plate 42a through a shaft 17b. A pin 17a secured to the sector gear is arranged to engage the arm 13e of a set plate 13. The set plate 13 is fitted by a slot 13a thereof on a guide pin which is not shown but is provided on a fixed part of the camera. The set plate 13 is thus slidable in the left and right directions as viewed in the drawing. The set plate 13 is provided with an arm 13e which engages the pin 17a to set the photograph taking lens barrel in an initial position; an arm 13c which engages the arm 15a of the above-staged lock lever 15; and another arm 13b which engages a charge lever 9. The set plate 13 is urged by a spring 14 in the direction of the arrow.

A motor 1 is arranged to drive a film winding mechanism and the set plate 13. A gear 1a provided on the output shaft of the motor 1 is arranged to rotate a gear 3a through a gear train which is not shown. To this gear 3a is secured a dividing plate 3 which is arranged to bring a film feeding action to a stop at every frame of the film in cooperation with a dividing lever 4. The dividing lever 4 is rotatable on a shaft 6 and is provided with a hooked part 4a which is arranged at the fore end of the lever 4 to engage a notch 3b of the dividing plate 3. The rear end of the lever 4 is secured to a contact piece 7a of a switch plate 7. A spring 5 urges the lever 4 so its fore end engages the dividing plate. The above-stated gear 3a engages another gear 8a. The gear 8a turns once when the gear 3a executes one turn and has a charge cam 8 secured thereto. A charge lever 9 is pivotally supported by a shaft 9a. Another shaft 9b on the charge lever 9 pivotally supports a lever 10 to make it rotatable. The lever 10 is urged by a spring 12 to rotate on the shaft 9b by a bent part 9c of the lever 9. At the fore end of the lever 10, a roller 10a serves as a cam follower for the charge cam 8. The roller 10a is constantly kept in contact with the outer circumference of the cam 8 by the force of a spring 11. A reference numeral 2 denotes a release button of the camera and 2a a switch of a control circuit which is not shown.

The embodiment which is arranged as described in the foregoing operates in the following manner: The embodiment is shown in FIGS. 1 and 2 in the state of having completed preparation for a photographic operation. When the release switch is operated through the release button to supply a signal to a control circuit CC, a distance measuring mechanism is actuated to measure a distance to the object to be photographed. Following this, the conductor coil 38b on the sector ring 38 is energized by power supply for a predetermined period of time, 5 m·sec for example. This causes the sector ring 38 to rotate clockwise until the sector pin 38a abuts the stopper part 15d of the lock lever 15. The spring 44 is energized by this rotation of the sector ring. At this time, the shutter blades 39 and 40 also rotate in the direction of opening the shutter. However, their deep, i.e., extensive degree of overlap prevents this rotation of the shutter blades from effecting the exposure condition. When the power supply to the conductor coil 38b for the predetermined period of time comes to an end, the urging force of the spring 44 causes the sector ring 38 to rotate counterclockwise. The sector pin 38a now collides against the end part 34c to disengage the first engaging part 34a of the holding lever 34 from the claw part 15c of the lock lever 15 as a result of the collision energy. Then, the force of the spring 37 urges the lock lever 15 clockwise until the claw part 15c thereof engages the second engaging part 34b of the holding lever 34. Therefore, the locking part 15a is disengaged from the arm part 13c of the set plate 13. The force of the spring 14 then urges the set plate 13 in the direction of the arrow. Following this, the force of the spring 41 urges the holding lever 34 on the supporting shaft 35 counterclockwise to a predetermined extent. The end 34c of the holding lever 34 pushes the sector ring 38a against the force of the spring 44. This causes the sector ring 38 to rotate clockwise. After that, the sector ring 38 is held by the lever 15 together with the lever 34. Accordingly, the shutter blades 39 and 40 rotate in the shutter opening direction. Their degree of overlap becomes shallower. The photometric window 43a which is used for measuring the object brightness for the preliminary indication is shielded from light by the end part 40a of the shutter blade 40. With the second engaging part 34b of the holding lever 34 engaging the claw part 15c of the lock lever 15, the end part 15d of the lock lever 15 is retracted from the operating region of the sector pin 38a.

When the set plate 13, which engages the pin 17a of the sector gear 17, begins to travel, it retracts the arm part 13e which has been restricting the counterclockwise rotation of the lens barrel ring 16. This allows the lens barrel ring 16 to be rotated by the urging force of the spring 16b. Then, the lens barrel 18 is moved along the pin 20 by the forwarding cam 16a and, at the same time, the pulse plate 28 is rotated counterclockwise with the rotation speed being adjusted by the governor gear 25. This rotation of the pulse plate 28 is detected in the form of a pulse number by the contact piece 29. When the pulse member reaches a value corresponding to the distance to the object detected by the distance measuring mechanism, the power supply to the electromagnet 32 is cut off by the control circuit which is not shown. With the power supply thus cut off, the urging force of the spring 33 causes the stop lever 30 to rotate clockwise on the support shaft 10b. With the lever 30 thus rotated, the fore end part 30a of the lever 30 engages the toothed part 27b of the ratchet wheel 27 to bring the rotation of the lens barrel 16 to a stop. This in turn brings the movement of the lens barrel 18 to a stop. The stop position of the lens barrel 18 represents an in-focus position for the object to by photographed. Following this, the set plate continues to move further. At the end of this movement, a protrudent part 13f of the set plate 13 pushes the end part 4b of the dividing lever 4 to cause the lever 4 to rotate clockwise against the urging force of the spring 5. Since this causes the end part 4a of the lever 4 to disengage from the locking groove 3b of the dividing cam 3, the gear 3a is rendered rotatable. Meanwhile, since the contact piece 7a slides over the switch 7 to shift the position of the switch 7, again the conductor coil 38b of the sector ring 38 have power supply thereto and the count starting switch (not shown) for the exposure control is turned on. At this time, since the stopper part 15d of the lock lever 15 is in the position as shown in FIG. 3, the sector pin 38a does not engage the stopper part 15d and thus allows the sector ring 38 to rotate against the urging force of the spring 44. The rotation of the sector ring 38 then causes the shutter blades 39 and 40 to begin a shutter opening action from the position shown in FIG. 3 and an exposure is effected. Then, the photometric window 43a opens according to the opening action of the shutter blade 40. With the photometric window 43a thus opened, a light sensitive element which is not shown detects a light quantity corresponding to the amount of exposure as the count starting switch (not shown) has been turned on. After that, when a given amount of exposure is detected by the light sensitive element, the control circuit (not shown) cuts off the power supply to the conductor coil 38b to allow the sector ring 38 to be rotated counterclockwise by the urging force of the spring 44. The shutter blades 39 and 40 are closed by this counterclockwise rotation of the sector ring 38. The photographic operation comes to an end. The shutter blades 39 and 40 are again held by a holding lever 34 in their positions as shown in FIG. 3.

After that, the control circuit (not shown) begins supplying power to the motor 1. The motor causes the charge cam 8 to rotate clockwise through the gears 3a and 8a. The clockwise rotation of the charge cam 8 pushes the lever 10 and, hence, turns the lever 9 in the counterclockwise direction. This causes the charge lever 9 to rotate on the support shaft 9a against the force of the spring 11. The fore end of the lever 9 comes to push the arm part 13b of the set plate 13 to bring the set plate 13 back to the photographic preparation completed position against the force of the spring 14. This movement of the set plate 13 causes the locking part 15b of the lock lever 15 to come into contact with the claw part 13d of the set plate 13. Then, the lock lever 15 rotates counterclockwise on the support shaft 36 to have the claw part 15c engage the first engaging part 34a of the holding lever 34 and also to have the end part 15a engage the part 13c of the set plate 13 thus bringing the set plate 13 to a stop in the photographic perparation completed position thereof. Further, the movement of the set plate 13 also causes the sector gear 17 to rotate the cam ring 16 against the force of the spring 16b. Therefore, the urging force of the spring 19 brings the lens barrel 18 back to the initial position thereof. The movement of the set plate 13 further causes the AF dividing ratchet wheel 27 to rotate clockwise and thus to bring the pushing up cam 27a back to its initial position. Then, with the charge spring 30c pushed upward by the push up cam 27a, the stop lever 30 is rotated counterclockwise to have the armature 31 kept in contact with the electromagnet 32. Further, when the first engaging part 34a of the holding lever 34 engaged with the claw part 15c of the lock lever 15, the degree of overlap of the shutter blades 39 and 40 again becomes deep (i.e., extensive) to provide a sufficient light shielding effect there.

After completion of film winding, when the dividing cam 3 makes one turn, the fore end part 4a of the dividing lever 4 enters the locking groove 3b of the dividing cam 3. The dividing cam lever 4 then rotates counterclockwise to shift the position of the switch 7 again. With the switch thus operated, the driving action of the motor 1 is stopped and the camera comes back to the condition shown in FIGS. 1 and 2.

As described in detail in the foregoing, in accordance with the present invention, the start of operation of an automatic focusing mechanism, for example, is controlled by the operation of the sector ring of the electromagnetically operated shutter which receives a preparatory power supply; and, during a period between the preparatory power supply and the commencement of an exposure, the sector ring which is arranged to drive the shutter blades is held in a position where the degree of overlap of the shutter blades is shallow. In an electromagnetically operated shutter having shutter blade members with a degree of overlap which is deep, the arrangement according to the invention permits accurate control over the amount of an exposure. In other words, the shutter according to the invention not only ensures prefect light shielding during a non-photographing period, but also permits accurate exposure control during a photographic operation.

What is claimed is:

1. A photographic camera having an electromagnetically operated shutter, comprising:
shutter blades displaceable between a position in which the blades cover an exposure aperture by overlapping each other over the aperture and a position in which said aperture is uncovered, said shutter blades being arranged also to serve as diaphragm blades;
a sector ring arranged to carry said shutter blades and to cause the shutter blades to perform opening and closing actions;
electromagnetic means for driving said sector ring for opening said exposure aperture;
control means for controlling the supply of power to said electromagnetic means;
holding means for holding said sector ring in a first position in which said shutter blades deeply overlap each other and in a second position in which the shutter blades shallowly overlap each other;
locking means for locking said holding means in said first position and in said second position; and
driving means for closing said exposure aperture.

2. A photographic camera according to claim 1, wherein a first power supply to said electromagnetic means shifts said holding means from the first position in which said sector ring holds said shutter blades in the deeply overlapped state to the second position in which said sector ring holds the shutter blades in the shallowly overlapped state.

3. A photographic camera according to claim 2, wherein said holding means is shifted from the first position to the second position by a double movement of said sector ring after the first power supply to said electromagnetic means.

4. A photographic camera according to claim 3, wherein there is provided automatic adjusting means for photographing; and the double movement of the sector ring after the first power supply to said electromagnetic means causes said automatic adjusting means to begin an adjusting action before the exposure effecting operation of said shutter blades.

5. A photographic camera according to claim 1, which further comprises a light measuring element for controlling the exposure amount, and a light transmitting window for the light measuring element,
said light measuring element receiving the light from the object through the light transmitting window to effect preliminary indication when the shutter blade is at the first position, said light transmitting window being closed by the movement of the shutter blade to the second position.

* * * * *

UNITED STATES PATENT AND TRADEMARK OFFICE
CERTIFICATE OF CORRECTION

PATENT NO. : 4,410,249

DATED : Oct. 18, 1983

INVENTOR(S) : Michio Hirohata, et al

It is certified that error appears in the above-identified patent and that said Letters Patent is hereby corrected as shown below:

On the title page the following should be added:

-- [30]      Foreign Application Priority Data

May 8, 1981 [JP]   Japan....................56-69901
    May 8, 1981 [JP]   Japan....................56-69902
    May 8, 1981 [JP]   Japan....................56-69903
    May 8, 1981 [JP]   Japan....................56-69910 --.

Signed and Sealed this

Twenty-first Day of February 1984

[SEAL]

*Attest:*

GERALD J. MOSSINGHOFF

*Attesting Officer*     *Commissioner of Patents and Trademarks*